United States Patent [19]

Pandorf

[11] Patent Number: 4,719,938

[45] Date of Patent: Jan. 19, 1988

[54] SELF-CLEANING VALVE AND CRYOPUMP UTILIZING THE SAME

[75] Inventor: Robert C. Pandorf, Newton Highlands, Mass.

[73] Assignee: Helix Technology Corporation, Waltham, Mass.

[21] Appl. No.: 693,121

[22] Filed: Jan. 22, 1985

[51] Int. Cl.[4] .......................... F16K 15/00; B08B 9/00; B01D 5/00

[52] U.S. Cl. ...................................... 137/244; 15/246; 62/55.5; 62/268; 92/78; 92/200; 137/516.27; 137/536; 137/540; 417/901

[58] Field of Search ..................... 62/6, 55.5, 100, 268; 15/246; 92/78, 87, 193, 194, 200, 242; 137/242, 244, 516.27, 536, 540; 417/901

[56] References Cited

U.S. PATENT DOCUMENTS

| | | | |
|---|---|---|---|
| 1,029,464 | 6/1912 | Ruwell | 137/516.27 |
| 1,621,638 | 3/1927 | McIntyre et al. | 137/242 |
| 1,805,959 | 5/1931 | Stephens | 92/200 |
| 1,917,639 | 7/1933 | Evans | 92/200 |
| 2,571,497 | 10/1951 | Stewart | 137/244 |
| 3,054,422 | 9/1962 | Napolitano | 137/516.27 |
| 3,658,083 | 4/1972 | Fetterolf et al. | 137/244 |
| 4,050,473 | 9/1977 | Cho | 137/244 |
| 4,249,561 | 2/1981 | Marttinen | 137/244 |
| 4,350,176 | 9/1982 | Lace | 137/242 |
| 4,350,179 | 9/1982 | Bunn et al. | 137/536 |
| 4,356,701 | 11/1982 | Bartlett et al. | 417/901 |
| 4,408,469 | 10/1983 | Forth | 62/268 |
| 4,438,632 | 3/1984 | Lessard et al. | 417/901 |

Primary Examiner—George L. Walton
Attorney, Agent, or Firm—Hamilton, Brook, Smith & Reynolds

[57] ABSTRACT

The pressure relief valve is debris resistant, self-cleaning, and self-actuating in a cryopump. It includes an o-ring carried by a valve member within a valve cylinder. In opening, the valve member moves away from an end port to open vent ports in the side of the valve cylinder while withdrawing the o-ring to a debris free and protected region of the valve. As the valve member is moved into the closed position in response to an atmospherical pressure differential, a wiper ring cleans debris from the inner surface of the valve cylinder. A taper is provided on the inner surface of the cylinder to release compression on the vacuum sealing o-ring upon opening and to compress the o-ring as the valve member moves to the closed position. The wiper ring is expansible in order to provide a wiping action along the entire taper and prevent debris from reaching the o-ring. The end of the valve cylinder opposite to the end port serves as a shock absorber as the valve is opened. An outer connecting flange is provided for connection of an exhaust housing.

12 Claims, 6 Drawing Figures

SELF-CLEANING VALVE AND CRYOPUMP UTILIZING THE SAME

DESCRIPTION

1. Technical Field

This invention relates to fluid valves and in particular to pressure relief valves on cryopumps.

2. Background

Cryopumps currently available, whether cooled by open or closed cryogenic cycles, generally follow the same design concept. A low temperature array, usually operating in the range of 4 to 25K, is the primary pumping surface. This surface is surrounded by a higher temperature radiation shield, usually operated in the temperature range of 70 to 130K, which provides radiation shielding to the lower temperature array. The radiation shield generally comprises a housing which is closed except at a frontal array positioned between the primary pumping surface and the chamber to be evacuated. This higher temperature, first stage frontal array serves as a pumping site for higher boiling point gases such as water vapor.

In operation, high boiling point gases such as water vapor are condensed on the frontal array. Lower boiling point gases pass through that array and into the volume within the radiation shield and condense on the lower temperature array. A surface coated with an adsorbent such as charcoal or a molecular sieve operating at or below the temperature of the colder array may also be provided in this volume to remove the very low boiling point gases such as hydrogen. With the gases thus condensed and/or absorbed onto the pumping surfaces, only a vacuum remains in the work chamber.

Once the high vacuum has been established, work pieces may be moved into and out of the work chamber through partially evacuated load locks. With each opening of the work chamber to the load lock, additional gases enter the work chamber. Those gases are then condensed onto the cryopanels to again evacuate the chamber and provide the necessary low pressures for processing. After continued processing, perhaps over several weeks, gases condensed or adsorbed on the cryopanels would have a volume at ambient temperature and pressure which substantially exceeds the volume of the cryopump chamber. If the cryopump shuts down, that large volume of captured gases is released into the cryopump chamber. To avoid dangerously high pressures in the cryopump with the release of the captured gases a pressure relief valve is provided. Typically, the pressure relief valve is a springloaded valve which opens when the pressure in the cryopump chamber exceeds about 3 pounds per square inch gauge. Because the process gases may be toxic, the pressure relief valve is often enclosed within a housing which directs the gases through an exhaust conduit.

After several days or weeks of use, the gases which have condensed onto the cryopanels and, in particular, the gases which are adsorbed begin to saturate the system. A regeneration procedure must then be followed to warm the cryopump and thus release the gases and to remove the gases from the system. As the gases are released, the pressure in the cryopump increases and the gases are exhausted through the pressure relief valve.

A typical pressure relief valve includes a cap which, when the valve is closed, is held against an o-ring seal by a spring. With pressures which open the valve, the cap is pushed away from the o-ring seal and the exhausted gases flow past the seal. Along with the gas, debris such as particles of charcoal from the adsorber or other debris resulting from processing within the work chamber also pass the seal. That debris often collects on the o-ring seal and the closure cap. The flowing gases also tend to dry the o-ring seal. In order to effect a tight vacuum after regeneration it is often necessary to clean the relief valve and apply vacuum grease to the o-ring. If such care is not taken, leaks into the cryopump result at the relief valve and provide an undesired load on the cryopump.

DISCLOSURE OF THE INVENTION

In accordance with principles of the present invention, the pressure relief valve of a cryopump comprises a valve cylinder which has at least one inlet port in communication with the cryopump chamber and at least one exhaust port. A valve member within the cylinder has a seal ring for pressing against the inner surface of the cylinder to close the inlet port from the exhaust port. The valve member further comprises a wiper ring for preceding the seal ring along the inner surface of the valve cylinder as the valve member is moved to the closed position to wipe debris from the inner surface of the valve cylinder. In the open position of the valve, the seal ring is isolated from fluid flow.

In one valve embodying the present invention, the inner surface of the valve cylinder includes a taper from a first inner diameter to a second reduced inner diameter. As the valve is closed, the seal ring moves from a position within the first inner diameter to a closed position within the second inner diameter at which the seal ring is compressed. The wiper ring which precedes the seal ring along the taper is expansible.

In a specific arrangement of a valve according to the present invention, the valve cylinder has at least one fluid port at an end of the cylinder and at least one transverse fluid port through a mid portion of the cylinder. The seal ring moves past the transverse ports to close those ports from the end port.

A preferred wiper ring includes a z-cut to allow for expansion and is backed by a spring ring. The wiping periphery of the ring is tapered such that contact with the inner surface of the cylinder is limited to a short axial length. A second wiper may be provided behind a first and a space for the collection of debris may be provided between the two wipers.

Preferably, the valve member is spring-loaded. The end of the valve cylinder opposite to the end port is closed but for a flow restriction. As the valve is opened the valve member moves toward that end of the cylinder and the restricted flow of fluid from that end of the cylinder assures a controlled movement of the valve member. The end of the valve member facing the end port is preferably conicle and includes pressure release grooves to prevent virtual leaks which might result from the capture of gases in the area of the wiper rings.

To provide for controlled exhaust of gases, a connecting flange may be provided about the outer circumference of the valve cylinder between the transverse port and the end port. The flange may be threaded to allow for ready connection to an exhaust housing.

BRIEF DESCRIPTION OF THE DRAWINGS

The foregoing and other objects, features and advantages of the invention will be apparent from the following more particular description of a preferred embodiment of the invention, as illustrated in the accompanying drawings in which like reference characters refer to the same parts throughout the different views. The drawings are not necessarily to scale, emphasis instead being placed on illustrating the principles of the invention.

DESCRIPTION OF A PREFERRED EMBODIMENT

Figure 1:
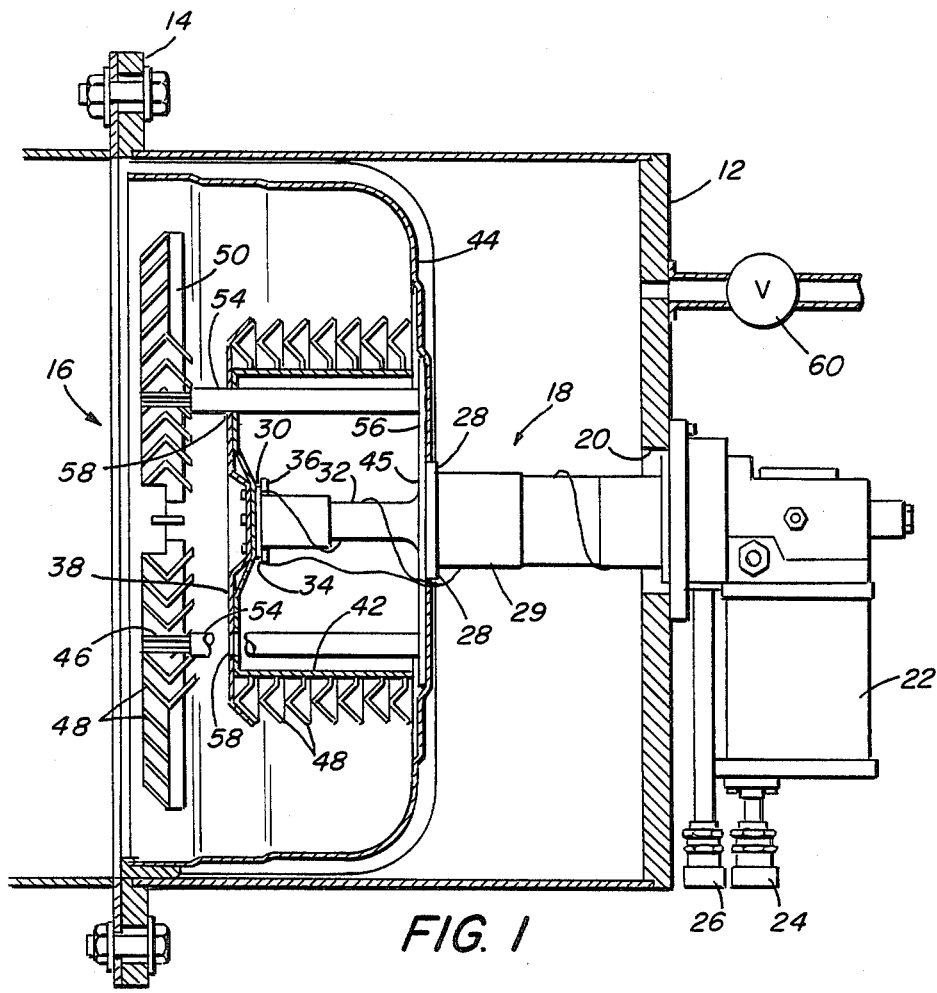
FIG. 1 is a cross-sectional view of a cryopump system embodying the present invention.

The cryopump of FIG. 1 comprises a main housing 12 which is mounted to a work chamber or a valve housing 13 along a flange 14. A front opening 16 in the cryopump housing 12 communicates with a circular opening in the work chamber or valve housing. Alternatively, the cryopump arrays may protrude into the chamber and a vacuum seal be made at a rear flange. A two stage cold finger 18 of a refrigerator protrudes into the housing 12 through an opening 20. In this case, the refrigerator is a Gifford-MacMahon refrigerator but others may be used. A two stage displacer in the cold finger 18 is driven by a motor 22. With each cycle, helium gas introduced into the cold finger under pressure through line 24 is expanded and thus cooled and then exhausted through line 26. Such a refrigerator is disclosed in U.S. Pat. No. 3,218,815 to Chellis et al. A first stage heat sink, or heat station 28 is mounted at the cold end of the first stage 29 of the refrigerator. Similarly, a heat sink 30 is mounted to the cold end of the second stage 32. Suitable temperature sensor and vapor pressure sensor elements 34 and 36 are mounted to the rear of the heat sink 30.

The primary pumping surface is a cryopanel array mounted to the heat sink 30. This array comprises a disc 38 and a set of circular chevrons 40 arranged in a vertical array and mounted to disc 38. The cylindrical surface 42 holds a low temperature absorbent such as charcoal. Access to this absorbent by low boiling point gases is through chevrons 40.

A cup shaped radiation shield 44 is mounted to the first stage, high temperature heat sink 28. The second stage of the cold finger extends through an opening 45 in that radiation shield. This radiation shield 44 surrounds the primary cryopanel array to the rear and sides to minimize heating of the primary cryopanel array by radiation. The temperature of this radiation shield ranges from about 100° K. at the heat sink 28 to about 130° K. adjacent to the opening 16.

A frontal cryopanel array 46 serves as both a radiation shield for the primary cryopanel array and as a cryopumping surface for higher boiling temperature gases such as water vapor. This panel comprises a circular array of concentric louvers and chevrons 48 joined by spoke-like plates 50. The configuration of this cryopanel 46 need not be confined to circular concentric components; but it should be so arranged as to act as a radiant heat shield and a higher temperature cryopumping panel while providing a path for lower boiling temperature gases to the primary cryopanel.

Thermal struts 54 extend between a plate 56 mounted to the heat sink 28 and the frontal array. Those struts extend through clearance openings 58 in the primary panel 38 and are thus isolated from that panel.

In a typical system, the cryopump is regenerated by turning off the refrigerator and allowing the system to warm. As the temperature of the system increases the gases are released, thus increasing the pressure in the system. As the pressure reaches about 3 PSIG the released gases are exhausted from the system through a relief valve 60.

Figure 2:
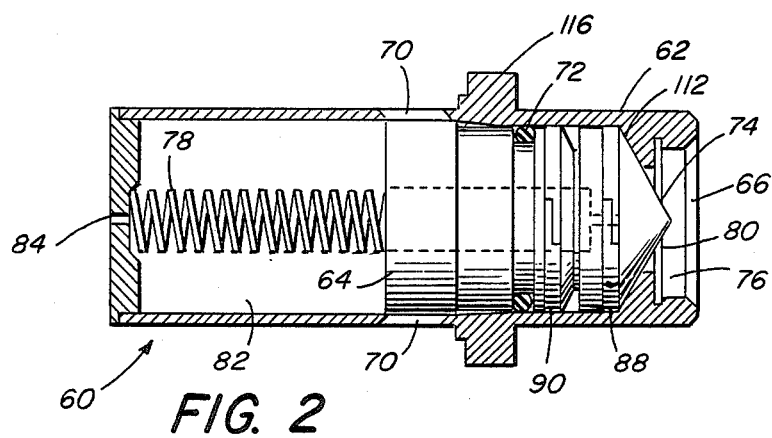
FIG. 2 is a longitudinal cross-sectional view of the pressure relief valve in the system of FIG. 1 in the closed position.
Figure 3:
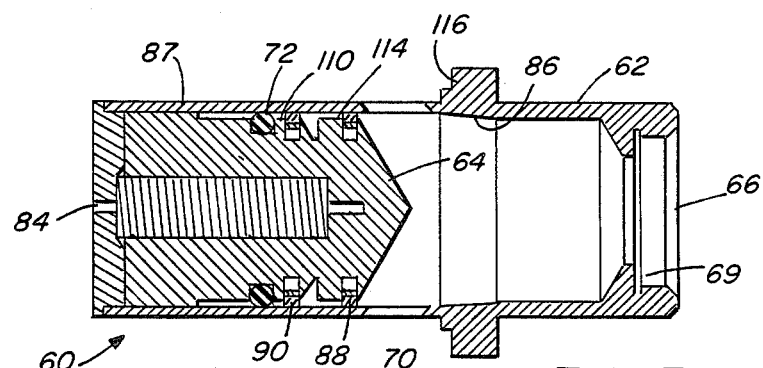
FIG. 3 is a longitudinal cross-sectional view of the pressure relief valve in the open position.
Figure 4:
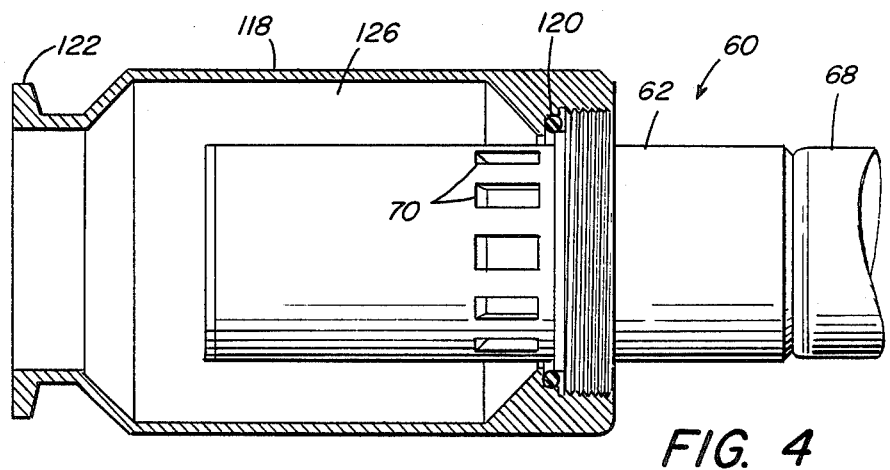
FIG. 4 is a sideview of the valve of FIGS. 2 and 3 with an exhaust housing, shown in section, mounted to the valve cylinder.

The relief valve 60 is shown in FIGS. 2 through 4. In those figures the valve is oriented such that the right end is to be connected to the cryopump chamber. The valve includes a valve cylinder 62 and a valve member 64 mounted within the cylinder for axial movement from a closed position shown in FIG. 2 to the open position shown in FIG. 3. The valve cylinder 62 includes an end port 66 to be coupled to the cyopump chamber through a conduit 68 (FIG. 4). An o-ring 69 provides a static seal between the cylinder 62 and the conduit 68. The valve cylinder also includes a number of circumferentially arranged transverse ports 70 at a midportion thereof. In the closed position of FIG. 2, an o-ring seal 72 is compressed by the inner surface of the valve cylinder 62 to form a tight vacuum seal between the end port 66 and the transverse ports 70.

A conicle end 74 of the valve member is pressed against an internal flange stop 76 of the valve cylinder by a pressure differential across the valve member once the vacuum has been drawn in the cryopump. A compression spring 78 pushes a first wiper ring 88 just past the exhaust ports 70 so that a vacuum differential can be established across the valve member 64 by the cryopump. That pressure differential draws the valve member to the closed position. To prevent gases from being trapped about the valve member between the o-ring seal 72 and the end flange 76, grooves 80 are cut in the nose 74. Without those pressure release grooves, the valve member pressed against the flange 76 might provide a partial seal which would result in a virtual leak from the dead spaces about the valve member during operation of the system. Although shown as straight cuts, spiral cuts or drilled holes might also provide the pressure release.

The valve cylinder may be of stainless steel. The valve member is preferably of a compatible non-corrosive material such as polytetrafluorethylene (sold under the trademark Teflon), acetal resin (sold under the trademark Delrin), synthetic resin coated metal or other suitable materials.

As the pressure in the port 66 to the right of the valve member increases to a level where the pressure force exceeds the forces of the pressure in the opposite end volume 82, static friction, and the compression spring 78, the valve member shuttles to the left of the valve cylinder to the position of FIG. 3. As the valve member moves past the peripheral ports 70, free flow of gases is provided from the cryopump chamber through the port 66 and the ports 70.

If very rapid pressure buildup occurred in the cryopump chamber, the valve member might be driven with great force to the left. To assure controlled movement of the valve member, the end volume 82 is closed but for a restriction 84. That restriction allows for controlled release of the gas in the volume 82 such that the volume 82 serves as a shock absorber.

A taper 86 is provided on the inner surface of the valve cylinder 62 between a first inner diameter at the left end of the valve cylinder and a second reduced inner diameter at the right end of the valve cylinder. That taper provides a mechanical advantage for compression of the o-ring 72 when the force of atmospheric pressure acts across the valve member 64. Typically, o-rings require a 20 to 30 percent squeeze to provide proper vacuum sealing.

The valve member is guided to the left of the taper by a raised length 87 at its left end. This raised length covers the exhaust ports 70 when the valve is in the closed position to prevent foreign debris from lodging behind the valve member and hindering its movement. To the left of the taper, the o-ring 72 is released from compression and moves freely within the valve cylinder to avoid wear and damage as it moves past the exhaust ports 70. When the valve is in its open position of FIG. 3, the o-ring is isolated from the exhaust ports by expansible rings 88 and 90. The o-ring 72 is thus in a debris-free region of the valve cylinder, isolated from the debris and drying action of the gases flowing through the valve.

During exhaust of gases from the cryopump chamber through peripheral ports 70, debris can be expected to collect on the inner surface of the valve cylinder to the right of the ring 88. Such debris, if allowed to be captured between the o-ring and the inner surface of the cylinder, would result in a system leak. In order that the o-ring will only contact clean surfaces, wiper rings 88 and 90 provided about the valve member serve as wipers. Those wiper rings precede the o-ring seal as it is moved into the closed position and wipe debris from the inner cylinder surface before the surface comes into contact with the o-ring. The distance between the wipers 88 and 90 is made greater than the diameter of the exhaust ports 70 to prevent debris from passing around the wipers and reaching the o-ring when the wipers pass the exhaust ports toward the open valve position.

Figures 5, 6:
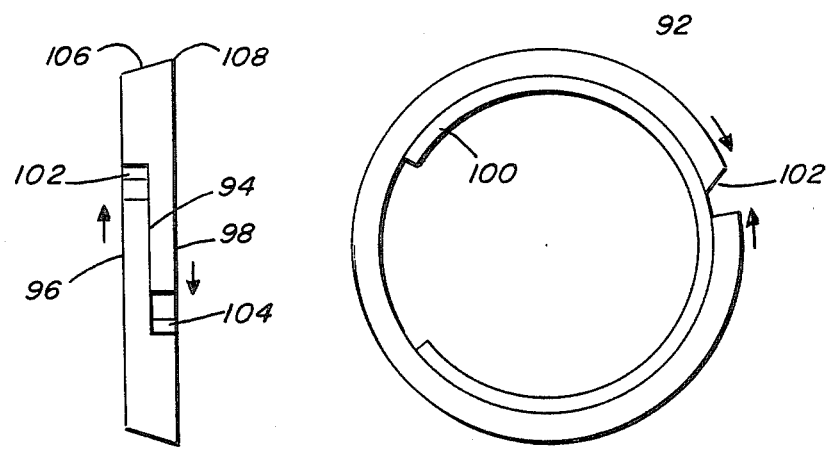
FIG. 5 is a sideview, greatly enlarged, of the wiper ring in the valve of FIGS. 2 and 3.
FIG. 6 is an end view of the wiper ring of FIG. 5.

In order to be able to scrape both primary diameters of the inner surface and the taper 86, the wiper rings must be expansible. To that end, each wiper blade is as shown in FIGS. 5 and 6. It includes an outer ring 92 having a z-cut 94 which permits sliding movement of end legs 96 and 98 of the ring relative to each other. This ring is expanded by its own internal tension and by an inner expansion ring 100 which may be of spring steel. As the wiper moves along the taper on the inner surface of the cylinder, the end of legs 96 and 98 move in the directions indicated by the arrows in FIG. 5 to compress the wiper ring against the inner expansion ring 100. Each leg 96, 98 moves toward a beveled surface 102, 104 as shown in FIG. 6. That bevel prevents the packing of debris between the leg and the shoulder on which the bevel is formed. Such packed debris might prevent proper closing of the wiper ring and thus prevent proper closing of the valve. The expansion ring 100 backing the wiper ring 92 also prevents any debris in the Z-cut gap between 96 and 102 from lodging under the wiper ring.

It can be seen that the outer periphery of the wiper blade is tapered at 106. This taper away from the leading edge 108 provides minimal contact area between the wiper blade and the inner surface of the valve cylinder to provide proper wiping without collection and compression of debris between the wiper ring and the cylinder. The blade is preferably of hard and durable plastic material such as acetal resin or polytetrafluoroethylene.

As an alternative to the hard z-cut wiper shown, the wiper may be of more flexible material which flexes as it slides along the taper to obtain an expansible wiping surface.

In front of each wiper blade the surface of the valve member is beveled at 110 and 114 to allow the debris scraped by the wiper to move away and not be compressed against the wiper or valve member. The conicle nose 74 is beveled at 110 at an angle to prevent the jamming of the wiper blade against the valve cylinder end sop by providing the small gap 112.

Preferably, the o-ring 72 is impregnated with polytetrafluoroethylene for self-lubrication. Alternatively, the wiper 90 may be replaced with a wiper of fibrous material which is saturated with a vacuum fluid to coat the inner surface of the cylinder with the vacuum fluid. Yet another approach is to provide a supply of vacuum fluid in a reservoir in the inner surface of the left end of the valve cylinder such that the o-ring 72 works against that reservoir with each closing of the valve. In any case, the o-ring 72 is always isolated by the wiper blades from gases flowing through the valve and is therefore less likely to become dry.

In order to provide for coupling of the valve 60 to an exhaust conduit, a threaded connecting flange 116 is provided about the valve cylinder 62. As shown in FIG. 4, an outer housing 118 may be threaded onto that flange. A static seal is provided by an o-ring 120. A clamp flange 122 is provided at the opposite end of the housing 118 to allow the housing to be readily clamped to an exhaust conduit. Thus, gas which is exhausted from the cryopump chamber passes through a cryopump conduit 68, through the valve cylinder 62, out the vent ports 70 through an annulus 126 in the housing 118 and finally through an exhaust conduit clamped to the housing at the flange 122.

While the invention has been particularly shown and described with reference to a preferred embodiment thereof, it will be understood by those skilled in the art that various changes in form and details may be made therein without departing from the spirit and scope of the invention.

I claim:

1. A cryopump having a pressure relief valve, the valve comprising:
    a valve cylinder having at least one inlet port in communication with a cryopump chamber and at least one exhaust port;
    a valve member within the cylinder having a seal ring for pressing against the inner surface of the cylinder to close the end port from the exhaust port, the valve member further comprising a wiper ring having a tapered outer periphery for preceding the seal ring along the inner surface of the valve cylinder as the valve member is moved to the closed position to wipe debris from the inner surface of the valve cylinder.

2. A cryopump having a pressure relief valve as claimed in claim 1 further comprising a second wiper blade and a debris collection annulus formed in the valve member between the two wiper blades.

3. A fluid valve comprising:
    a valve cylinder having an inner surface which includes a taper from a first inner diameter to a second reduced inner diameter;

a valve member having a seal ring for movement within the valve cylinder from a position within the first inner diameter to a closed position within the second inner diameter at which the seal ring is compressed the valve member further comprising, two expansible wiper rings with a debris collection annulus formed in the valve member therebetween for preceding the seal ring along the tapered surface as the valve member is moved to the closed position to wipe debris from the inner surface of the valve cylinder.

4. A valve as claimed in claim 3 wherein the wiper blade has a tapered outer periphery.

5. A valve as claimed in claim 3 wherein the wiper blade has a z-cut to allow for expansion and has a spring ring pressing outward against the wiper ring.

6. A valve as claimed in claim 3 wherein the valve cylinder has at least one end fluid port at one end thereof and at least one transverse fluid port through a midportion of the cylinder.

7. A valve as claimed in claim 6 wherein the distance between the wiper blades is greater than the axial length of the transverse fluid port.

8. A fluid valve comprising:

a valve cylinder having at least one end fluid port at one end thereof and at least one transverse fluid port through a midpoint of the cylinder;

a valve member within the cylinder having a seal ring movable past the transverse port into a position at which the seal ring abuts the inner surface of the cylinder to close the end of fluid port from the transverse fluid port, the valve member further comprising two wiper rings with a debris collection annulus formed in the valve member therebetween for preceding the seal ring along the inner surface of the cylinder as the valve member is moved to the closed position to wipe debris from the inner surface of the valve cylinder.

9. A valve as claimed in claim 8 wherein the wiper blade has a tapered outer periphery.

10. A valve as claimed in claim 8 wherein the wiper blade has a z-cut allow for expansion and has a spring ring pressing outward against the wiper ring.

11. A valve as claimed in claim 8 wherein the valve cylinder has at least one end fluid port at one end thereof and at least one transverse fluid port through a midportion of the cylinder.

12. A valve as claimed in claim 11 wherein the distance between the wiper blades is greater than the axial length of the transverse fluid port.

* * * * *